United States Patent [19]

Josephson

[11] Patent Number: 4,706,177
[45] Date of Patent: Nov. 10, 1987

[54] DC-AC INVERTER WITH OVERLOAD DRIVING CAPABILITY

[76] Inventor: Elliot Josephson, 150 Josselyn La., Woodside, Calif. 94062

[21] Appl. No.: 797,834

[22] Filed: Nov. 14, 1985

[51] Int. Cl.$^4$ ................ H02M 3/335; H02H 7/122
[52] U.S. Cl. .................................... 363/24; 363/56; 363/98; 363/132
[58] Field of Search ................ 363/17, 24, 25, 26, 363/37, 40, 41, 50, 56, 97, 98, 132, 133, 134; 361/87; 323/272, 907

[56] References Cited

U.S. PATENT DOCUMENTS

| | | | |
|---|---|---|---|
| 3,970,916 | 7/1976 | Kienscherf | 363/41 |
| 4,225,912 | 9/1980 | Messer | 363/57 |
| 4,389,702 | 6/1983 | Clemente et al. | 363/56 |
| 4,410,935 | 10/1983 | Dang | 363/56 |
| 4,578,744 | 3/1986 | Antula | 363/37 |

FOREIGN PATENT DOCUMENTS

| | | | |
|---|---|---|---|
| 12579 | 6/1983 | Japan | 363/50 |
| 666604 | 6/1979 | U.S.S.R. | 363/50 |

OTHER PUBLICATIONS

IBM Technical Disclosure Bulletin, vol. 26, No. 5, Oct. 1983, pp. 2246–2248.

*Primary Examiner*—Patrick R. Salce
*Assistant Examiner*—Judson H. Jones
*Attorney, Agent, or Firm*—Fitch, Even, Tabin & Flannery

[57] ABSTRACT

A DC-AC inverter includes a bridge converter for converting an input DC into an output AC signal which uses field-effect transistors in the bridge circuit. The characteristics of the field-effect transistors enable the bridge converter to temporarily supply power in significant overload conditions. A DC-DC converter may also be included between the DC power source and the bridge converter to provide voltage boosting, when required. Field-effect transistors are also included in the DC-DC converter for power switching. The duration and amount of overload current output by the bridge converter is monitored and when an overcurrent condition beyond a predetermined amount or duration is detected, the bridge converter is disabled. The bridge converter is reenabled at a predetermined time thereafter.

A plurality of field effect transistors may be connected in parallel at each location wherein a solid state power switching device is used in the inverter to thereby multiply the power handling capacity of the inverter as a whole.

6 Claims, 7 Drawing Figures

CURRENT REQUIRED TO TRIP OVERLOAD SHUTDOWN VS. TIME

DC-AC INVERTER WITH OVERLOAD DRIVING CAPABILITY

BACKGROUND OF THE INVENTION

The present invention relates to inverter circuits for converting direct current power into alternating current power. More specifically, it relates to inverter circuits utilizing field-effect transistors for increasing overload driving capability.

DC-AC inverters are designed to convert a DC power source into an AC power output. Such inverters are commonly used to provide power for AC induction motors, to light incandescent lights, or the like, from a battery or gasoline powered electric power source. It is important in many such applications that the inverter have the ability to handle brief overload current demands. For example, a lamp may require ten times its normal running current to start up.

In the earlier art, the battery power source was coupled to an electric motor/generator combination called a dynamotor to provide AC power. Such an arrangement required considerable current to operate, and was therefore not very efficient. Early electronic DC to AC inverters used a large, low frequency transformer. A vacuum tube or transistor switching arrangement induced a current in the primary of the transformer and an alternating current was thereby induced in the transformer secondary. A disadvantage of using this type of DC to AC converter was the bulk and weight of the transformer. In addition to being expensive to manufacture, the transformer was inefficient and tended to generate heat and excessive vibration. Often, the value of voltage produced, both as to voltage level and frequency, was also unstable.

Transformers and rotating electrical machines have traditionally had substantial short term overload capability, since an overload simply dissipates more power in the copper which make up these machines. However, this ability to dissipate excess heat energy does not exist in bipolar transistor devices, thyristors, and other electronic switching devices used in more recent solid-state DC-AC inverters. A significant problem with such prior art solid-state DC-AC inverters is that the absolute maximum rating at which the inverter can be operated is generally only slightly higher than the recommended operating range of the inverter. Since the solid-state inverter is not built to have surge capability, any power demand in excess of the rated maximum could destroy the inverter in a small fraction of a second. Conventional protection circuits are known in the art to protect against such a result when an overload condition occurs, but such circuits do not enable the inverter to supply significantly higher output power during such an overload condition.

The solid-state inverter's lack of an ability to handle power surge demands results in a severe mismatch between the rating of the solid-state inverter and the load. For example, a one horsepower induction motor can require 4,000 watts of power when power is first applied to the motor, but only 1,000 watts of power after the motor has been running for a short time. To avoid destruction, a conventional solid-state inverter would need to have a rated load capacity of 4,000 watts to power such a motor rather than the 1,000 watts of power needed by the motor after it has started running. Significant economies are possible if a lower rated inverter could be used in a given application, in terms of inverter component size, etc.

Prior art attempts have been made to build inverters having greater overload or surge capacity. Inverters built of thyristors, for example, have been attempted, but these circuits have not significantly enhanced the surge capability of such inverters. See, e.g., U.S. Pat. No. 4,225,912 to Messer.

SUMMARY OF THE INVENTION

Therefore, an object of the present invention is to provide a solid-state DC-AC inverter having the ability to satisfy the significant surge demands of induction motors or the like without requiring that the inverter's power rating closely match such temporary high power demands.

A further object of the present invention is to provide an inverter which makes full use of the surge current carrying capability of field-effect transistors to provide a factor of four increase or more in power capacity during short-term overcurrent demand conditions.

A still further object of the present invention is to use field-effect transistors in a bridge type inverter driven from an initial DC to DC voltage boost circuit, which also uses field-effect transistors, to maximize inverter surge capacity.

The present invention is a DC-AC inverter which uses a plurality of field-effect transistors to perform power switching operations and includes means for detecting an overcurrent condition on the inverter output and for triggering the temporary shutdown of inverter output power when the surge capacity of the inverter field-effect transistors has been exceeded.

The DC to AC converter according to the present invention includes a DC voltage source, such as a battery, which is capable of driving the maximum rated overload, a field-effect transistor DC to DC converter to convert the source voltage to a higher second DC voltage level and to further provide isolation between the DC source and the output load, and a plurality of field-effect transistor switches connected as a bridge and appropriately driven to convert the second DC voltage level to an AC output at the desired frequency.

To further increase the power capacity of the inverter circuit, a plurality of field-effect transistors are connected in parallel at each location wherein a solid state power switching device is required in the inverter, to thereby multiply the power handling capacity of the inverter as a whole.

The advantage of the present invention is that it significantly enhances the overload driving capacity of an inverter beyond the limited over-current capability of prior art solid-state static DC to AC inverters by taking advantage of the exceptionally high surge current capability of field-effect transistors, which typically runs a factor of 4 to 1, compared with the steady state current rating for such transistors. By utilizing and appropriately protecting these field-effect transistors in the inverter, a good match to expected high in-rush loads is achieved so as to enable a much lower rated inverter to be used in a desired application.

BRIEF DESCRIPTION OF THE DRAWINGS

These and other objects and advantages of the present invention will become more apparent with reference to the following detailed description and the accompanying drawings in which.

DETAILED DESCRIPTION OF THE PREFERRED EMBODIMENT

Figure 1:
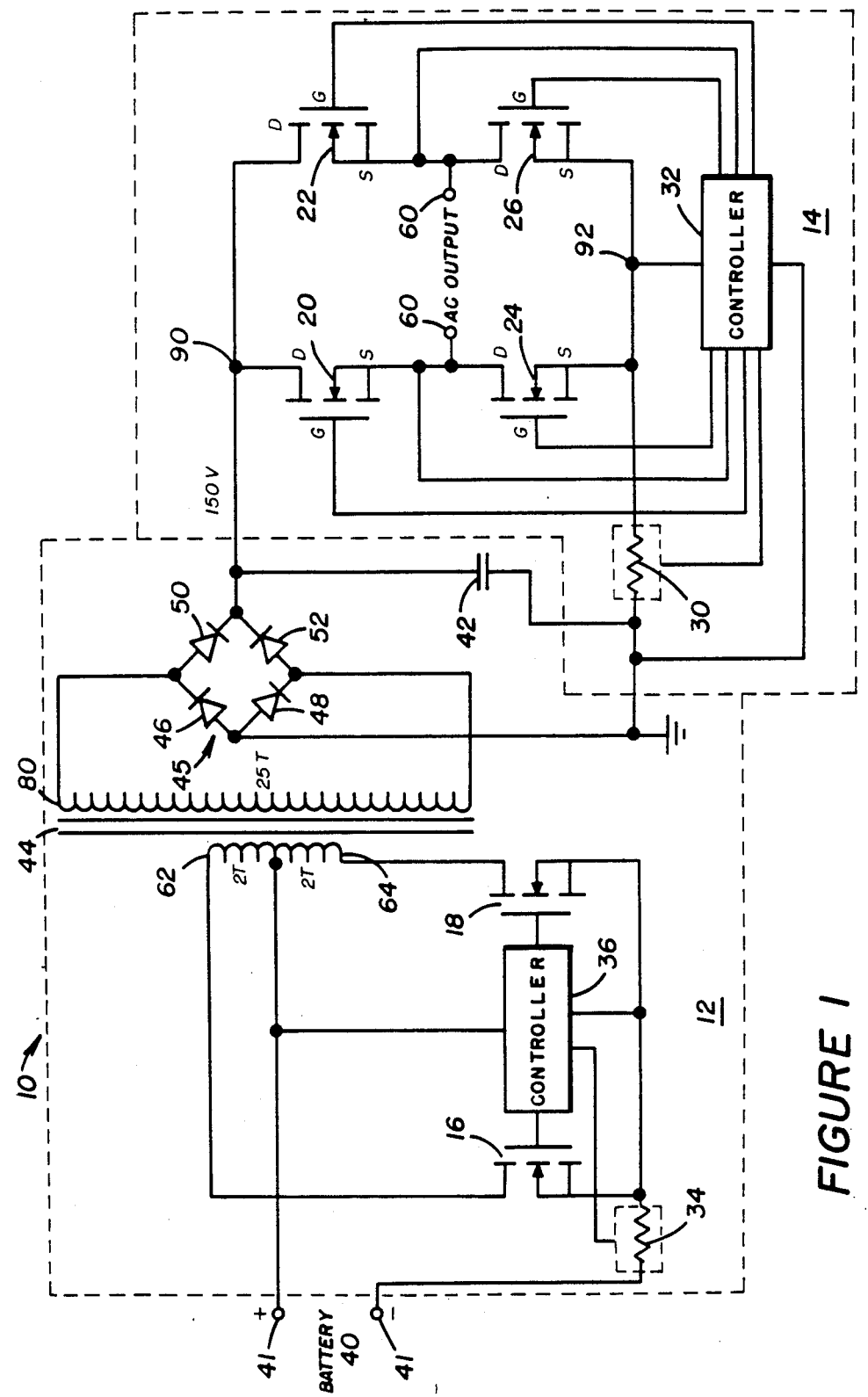
FIG. 1 is a block diagram of a DC-AC inverter according to the present invention.

A simplified block diagram of a DC-AC converter according to the present invention is illustrated at 10 in FIG. 1. The inverter 10 includes two major subcircuits, a DC-DC converter on the primary side of the inverter 10, shown within the dotted line at 12, and a bridge converter on the secondary side of inverter 10, for converting the DC output of converter 12 into AC output power. This bridge converter is shown within the dotted line at 14.

The DC-DC converter 12 is a conventional center tap driven push-pull type of converter enabling high power output. The bridqe converter 14 also operates in a conventional manner to provide high output AC power from a DC source. The solid-state switching devices in the DC-DC converter 12, shown at 16 and 18, are both field-effect transistors. In bridge converter 14, the four transistors connected together in a bridge configuration also comprise field-effect transistors, as shown at 20, 22, 24 and 26.

There are two significant reasons why field-effect transistors are essential to the present invention and provide the characteristics desired by the inverter 10 according to the present invention. In general, field-effect transistor (FET) devices are voltage controlled devices wherein the current through two terminals is varied by an electric field arising from a voltage applied to a third terminal. In other words, the current flowing between the source and drain terminals of the field-effect transistor is controlled by the voltage applied to the gate terminal of the transistor. The resistivity of the channel between the source and drain is fixed by its doping characteristics. The channel resistance seen by current flowing between the source and drain can thereafter be varied by changing the effective cross-sectional area of the channel. This is a function of the voltage on the gate of the transistor. Consequently, when the transistor is on, the channel region looks like a resistor to the circuit, such that significantly higher currents than the normal rated current can flow through the channel for short durations. A typical MOSFET having a 18 amp capacity at 250° C. or a 12 amp capacity at 100° C. has an absolute peak capacity for short durations of 72 amps.

The drawback of bipolar devices and other electronic devices having PN junctions across which the current must flow, is that there is almost no capacity for surge current through the device. Any significant increase in current beyond the rated power factor for even a brief fraction of a second in bipolar devices will cause the bipolar device to self-destruct.

A second important aspect of field-effect transistors is that they can be connected in parallel to increase the power capacity of the resultant switch. Since the gate of a field-effect transistor is usually segregated from the channel by means of an oxide coating (a MOSFET) or a reverse bias junction (a JFET), the resultant high input impedance enables very little current drive to be necessary for driving each transistor. The problem of providing drive current for such transistors is also less of a problem than if multiple bipolar transistors were being driven. This paralleling feature of field-effect transistors is utilized in the present invention, as described in greater detail below. In a preferred embodiment, ten field-effect transistors are connected in parallel for each of the field-effect transistors 16 and 18 and two in parallel for each of the field-effect transistors 20, 22, 24 and 26. These latter FETs may comprise N-channel power MOSFETs made by International Rectifier, part number IRF640.

A critical factor that must be taken into account when field-effect transistors are used in power switching according to the present invention, is that the amount of overload current allowed through a given field-effect transistor and the duration of this overload current must be controlled. For example, an overload current at the rated maximum current of the FET must be detected and must trigger the shutdown of the circuit very quickly. Where the overload current is much lower in amplitude, such as an overload that is twice the FET's normal power rating, the circuit will not be shut down for some delay period in anticipation that the overload condition will be temporary. To implement this control according to the present invention, as seen in FIG. 1, a current sense resistor 30 is placed in the circuit between the DC positive rail and the ground return rail to monitor output current demand. The voltage produced across the current sensing resistor 30 is detected by a controller circuit 32 which controls the operation of bridge converter 14. As described in greater detail below, when an overcurrent condition of sufficient magnitude occurs, controller 32 acts to temporarily shut down the bridge converter 14. This prevents damage to the field-effect transistors in the bridge circuit. A predetermined delay time after shutdown occurs, the bridge converter 14 automatically goes back on and again begins to supply AC output power. To protect against a failure in the bridge converter 14 which would preclude normal shutdown in the event of overload, a current sense resistor 34 is also included on the primary side of the DC-AC inverter 10 according to the present invention. The voltage across resistor 34 is sensed by a controller 36 which controls the operations of DC-DC converter 12. When an overcurrent condition of magnitude and time greater than a predetermined time is detected by controller 36, it causes shut down of the DC-DC converter 12.

In operation, the DC-DC converter 12 portion of the present invention takes the voltage supplied by a power source such as a battery 40, which is coupled to inverter 10 via input terminals 41, and converts this first DC voltage into a second DC voltage appearing across a capacitor 42. In essence, the DC-DC converter 12 is a push-pull arrangement of the two field-effect transistors 16 and 18. To create push-pull operation, controller 36 alternately causes transistor 16 or transistor 18 to turn on during alternate half cycles to cause current to flow through a transformer 44 either in one direction or in the opposite direction. Controller 36 also preferably turns off one of the transistors 16, 18 just before turning on the other of these transistors to prevent the possibility of any overlap condition where both transistors are on at the same time.

The advantage of this push-pull arrangement is that the voltage across transformer 44, and hence the peak voltage applied to the transistors 16 and 18, is limited to twice the supplied voltage of battery 40. Also, the power supplied to the secondary side of transformer 44 is never stored in transformer 44 but passes from the conducting transistor through the transformer and out into the load. In this way, more power can be handled at greater efficiency and with better regulation then with a single ended converter.

The output of transformer 44 is an AC square wave which must be rectified to generate the output DC desired. This is performed by a conventional bridge rectifier 45 comprising four diodes, diodes 46, 48, 50 and 52, connected as shown. Capacitor 42 is a large capacitor of 1600 microfarads, and acts to filter the output of rectifier 45 for input of the resultant DC to bridge converter 14.

The output voltage across capacitor 42 is a function of the turns ratio of transformer 44. As seen, in the preferred embodiment, each half of the primary side of transformer 44 is a two turn winding and the secondary side is a twenty-five turn winding, thereby providing a voltage multiplication of a factor of greater than ten. An input battery voltage of 12 volts, for example, is therefore boosted to approximately 150 volts DC across capacitor 42.

Finally, note that the DC-DC push-pull circuit 12 is driven by controller 36 without regulation. That is, no feedback of the output voltage or current being generated by the DC-DC converter 12 is provided to control the switching of transistors 16 or 18.

The bridge converter 14, under the control of controller 32, takes the 150 volts DC appearing at its input and creates a quasi-square wave which approximates an AC sine wave across inverter 10 AC output terminals 60. Controller 32 controls the switch timing of each of the FETs 20, 22, 24 and 26 to create this output. The voltage across current sense resistor 30 is detected and amplified in the controller 32 and used to shut down the switching operation of the bridge transistors and thereby stop the coupling of power out to terminals 60 when an overload of excessive magnitude is detected. The controller 32 includes means for disabling the output power as a function of the amplitude and time duration of the over-current condition.

To generate the AC quasi-square wave output signal on terminals 60, the bridge converter 14 transistors are switched in the following manner. In a given cycle, starting for example with transistors 20 and 26 conducting simultaneously, a peak voltage in one direction is produced. Then, transistor 26 is turned off and transistor 22 turned on to create a zero output voltage across terminal 60. Next, transistor 20 is turned off and transistor 24 turned on to create a maximum negative voltage across terminal 60. Finally, transistor 22 is turned off and transistor 26 is turned on to again create a zero voltage across terminals 60. Transistor 24 is turned off and transistor 20 turned on to start the next cycle. With an input DC voltage at approximately 150 volts, an output AC voltage of about 300 volts peak-to-peak quasi-square wave (120 volts RMS) appears across terminals 60. Further details of the operation of the bridge converter 14 is described hereinbelow.

Figure 2:
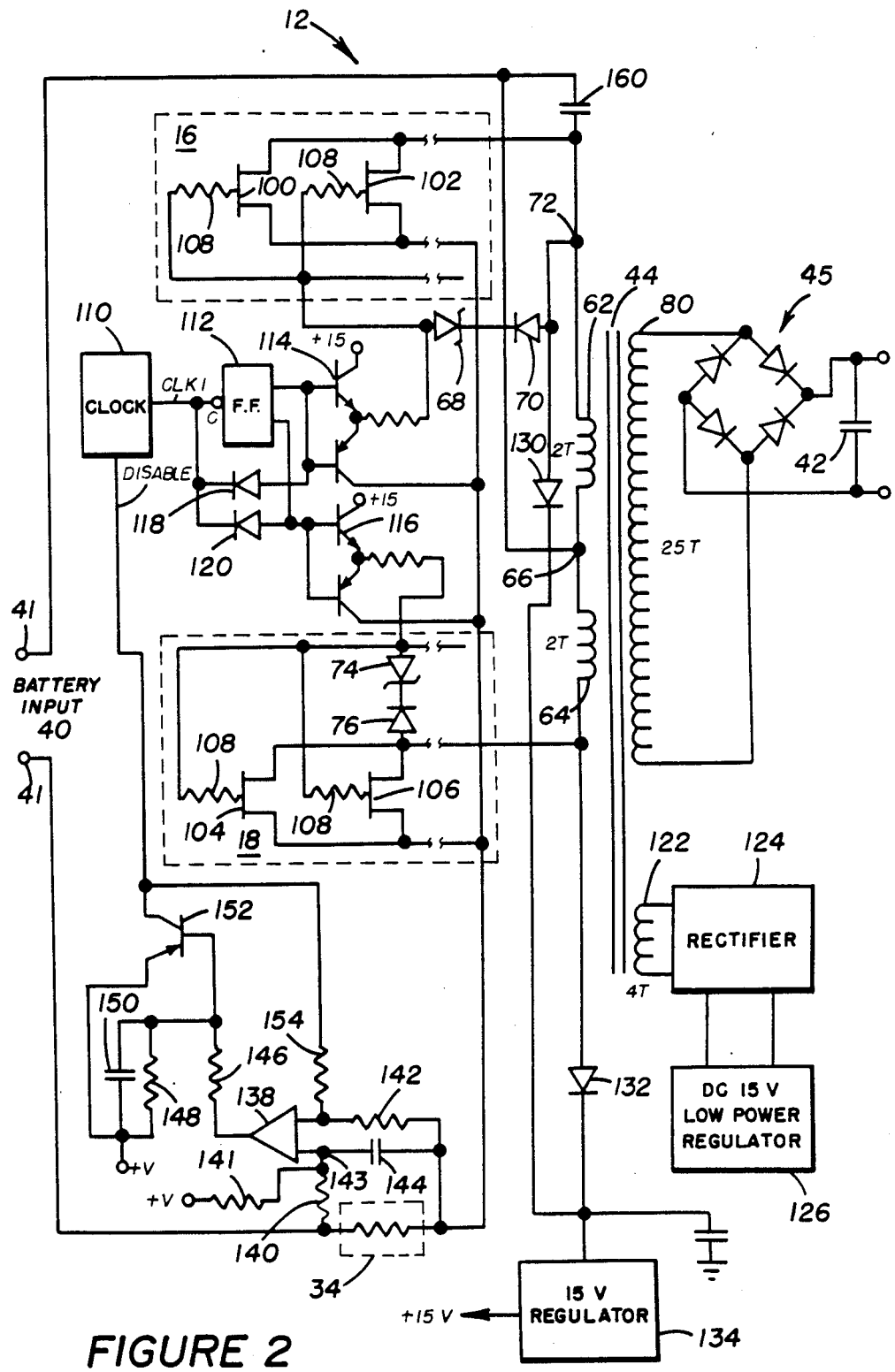
FIG. 2 is a more detailed schematic diagram of the primary side of the inverter of FIG. 1 illustrating a DC-DC, converter circuit according to the present invention.

Referring now to FIG. 2, illustrated in FIG. 2 is a more detailed schematic of the DC to DC converter 12 according to the present invention.

As seen in FIG. 2, each field-effect transistor 16, 18 comprises a plurality of field-effect transistors coupled in parallel. Thus, field-effect transistor 16 includes a plurality of field-effect transistors, an exemplary two of which are shown at 100 and 102, which are connected in parallel to switch current in one direction through transformer 44, via winding 62. Similarly, field-effect transistor 18 includes a plurality of field-effect transistors, as at 104 and 106 which are connected in parallel and switch current in the opposite direction through transformer 44, via winding 64.

Each of these individual field-effect transistors are driven by a 10 ohm resistor 108 fed from controller 36. Each of the FETs 16 and 18 include a protection circuit to prevent an excess amount of voltage to appear at the drain of each said transistor which is connected to the side of windings 62, 64 opposite to the center tap point 66 of transformer 44. As seen in FIG. 2, between the drain of transistor 16 and the gate of transistor 16 on the output side of driving resistor 108 is a zener diode 68 in series with a conventional diode 70. Zener 68 is designed to guard against when the voltage on the drain line corresponding to node 72 exceeds the breakdown voltage of FET 16. Zener 68 functions to become conductive at a predetermined voltage, e.g. 45 volts, which causes the gate of transistor 16 to turn back on and keeps the drain voltage from getting any higher. That is, zener diode 68 automatically clamps node 72 at this voltage. This is needed because the breakdown rating only needs to be exceeded for a time on the order of nanoseconds before the FET 16 would be destroyed. This effect is caused by leakage induction generated in transformer 44 and in the transistor leads. Diode 70 is in series with zener diode 68 to prevent current from flowing in the opposite direction from the gate of transistor 16 to node 72, to prevent shunting of gate drive current into the drain of the FET. A similar zener diode 74 is connected between the drain of transistor 18 and the gate of transistor 18 on the output side of driving resistor 108. Similarly, a conventional diode 76 is included to prevent gate drive current from flowing into the drain of FET 18. This overvoltage on the drains of transistor 16 and 18 usually does not occur in steady state conditions, but just on power startup and when heavy transient loads are being driven by the inverter 10 according to the present invention.

In a preferred embodiment, controller 36 includes a clock 110 whose output, shown as CLK1, is coupled to a flip-flop 112. The outputs Q and $\overline{Q}$ of flip-flop 112 are coupled respectively to field-effect transistor drivers 114 and 116. Drivers 114 and 116 each comprise conventional dual emitter follower drivers for driving the gates of their respective field-effect transistors. With drivers 114 and 116 coupled to alternate outputs of the flip-flop 112, as can be seen, they are turned on alternately by the operation of flip-flop 112.

To insure that one field-effect transistor 16, 18 is turned off before the other transistor 16, 18 is turned on, a circuit is provided for creating a notch in the middle of the flip-flop switching to insure that no overlap exists whereby both transistors 16 and 18 are on at the same time. This function is provided by diodes 118 and 120 connected as shown in FIG. 2. These diodes couple the Q and $\overline{Q}$ outputs of flip-flop 112 to the clock input to flip-flop 112. As a result, whenever the clock is low, it clamps the Q and $\overline{Q}$ outputs to a low logic level.

Figure 4:
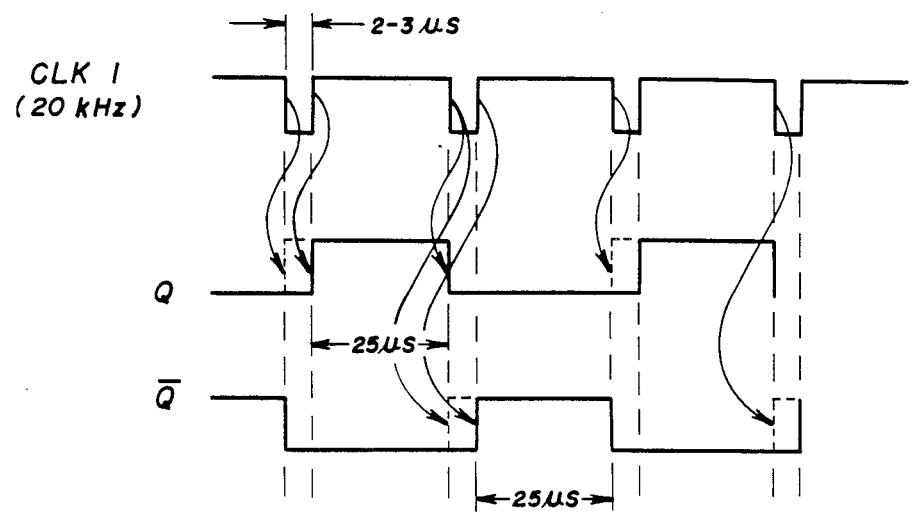
FIG. 4 is a timing diagram of the DC-DC converter circuit shown in FIG. 2.

A timing diagram illustrating operation of this circuit is illustrated in FIG. 4. Flip-flop 112 is a conventional flip-flop which triggers on the negative going edge of an input clock pulse for causing the flip-flop to flip to its alternate state. As seen in the timing diagram of FIG. 4, diodes 118 and 120 act to alternatively clamp the Q and $\overline{Q}$ outputs of flip-flop 112 when these signals first go high. According to a preferred embodiment, the CLK1 pulse operates at approximately 20 kHZ. The clock pulse itself is a negative going pulse of approximately 2–3 microseconds out of a clock cycle time of 25 microseconds per pulse. As can be seen, with the first negative going edge of the CLK1 pulse, flip-flop 112 changes state such that the Q output line should go high at that point, as shown in phantom. Due to the operation of diode 118, however, this signal is locked off and kept low until the trailing edge of the CLK1 pulse appears and at that point the Q line goes high to drive FET 16. During this time, $\overline{Q}$ output line is low to prevent corresponding drive to be coupled to FET 18. At the end of this clock cycle, during the next negative going edge of the CLK1 pulse, the Q signal goes low but $\overline{Q}$ is now locked off by diode 120 and kept from being turned on until the trailing edge of the next CLK1 pulse, at which time it goes high and the Q signal line remains low. Consequently, the above-described circuit provides a maximum drive signal for each of the FETs 16 and 18 while maintaining a predetermined notch equal to the pulse width of the CLK1 pulse between each drive pulse coupled alternately to FETs 16 and 18.

In addition to the 25 turn winding on the secondary side of transformer 44, shown at 80, a second four turn winding is also provided as shown at 122. The AC output of this winding is coupled to another conventional diode rectifier 124. The rectified DC generated by rectifier 124 is regulated by a conventional low power 15 volt regulator 126 to produce an output DC 15 volt power source. This power source is used to power logic circuits used in the bridge converter 14 according to the present invention, as described below.

A similar regulated 15 volts is generated on the primary side of transformer 44 to operate the clock and flip-flop logic and driver circuits 114 and 116 as described above. This 15 volts is created by diodes 130 and 132 connected on opposite sides of the two turn windings 62, 64 of transformer 44 from the center tip 66. Diodes 130, 132 are coupled to a conventional 15 volt regulator 134 for providing this DC 15 volt power output.

In addition to the overcurrent protection provided for bridge converter 14, as described above, overload current protection is also provided on the primary side for the DC to DC converter 12. Such a circuit is necessary on the primary side to protect against a failure of the bridge converter 14 shutdown circuit. This is important because otherwise the DC to DC converter could couple hundreds of amps into the secondary side of the circuit if a component failure occurs on the secondary side.

To perform shutdown of the DC to DC converter 12, both amplitude and duration of an overload are monitored. Shutdown is caused to occur only if these predetermined parameters are exceeded. When shutdown of converter 12 occurs the shutdown is not disabled after a delay, as when a shutdown of the bridge converter 14 occurs, but remains on until the power supply is reset.

Shutdown of DC-DC converter 12 is accomplished by monitoring the voltage across current sensing resistor 34. This is performed by means of a comparator 138 fed by two 1K resistors 140 and 142 which are connected on opposite sides of resistor 34. Capacitor 144 functions to provide noise filtering of the power rail connected to terminal 41. The value of capacitor 144 can be chosen in a conventional manner to obtain the desired filtering. Resistor 141 biases node 143 to a slightly positive voltage. When this point goes to ground, comparator 138 goes on. The output of comparator 138 feeds through a second RC circuit comprising resistors 146 and 148 and capacitor 150 to a transistor switch 152. This RC network delays the switching on of transistor 152 until a predetermined time has elapsed.

Once transistor switch 152 turns on, it remains on regeneratively through the feedback path provided by resistor 154 and comparator 138. Switch 152 maintains comparator 138 on once transistor 152 closes. The collector of transistor 152 is also coupled to clock 110 to disable the clock output signal CLK1, and thereby disable the operation of the DC to DC converter 12.

Input DC filtering for converter 12 is provided by a large capacitor 160, as shown in FIG. 2.

Figure 3:
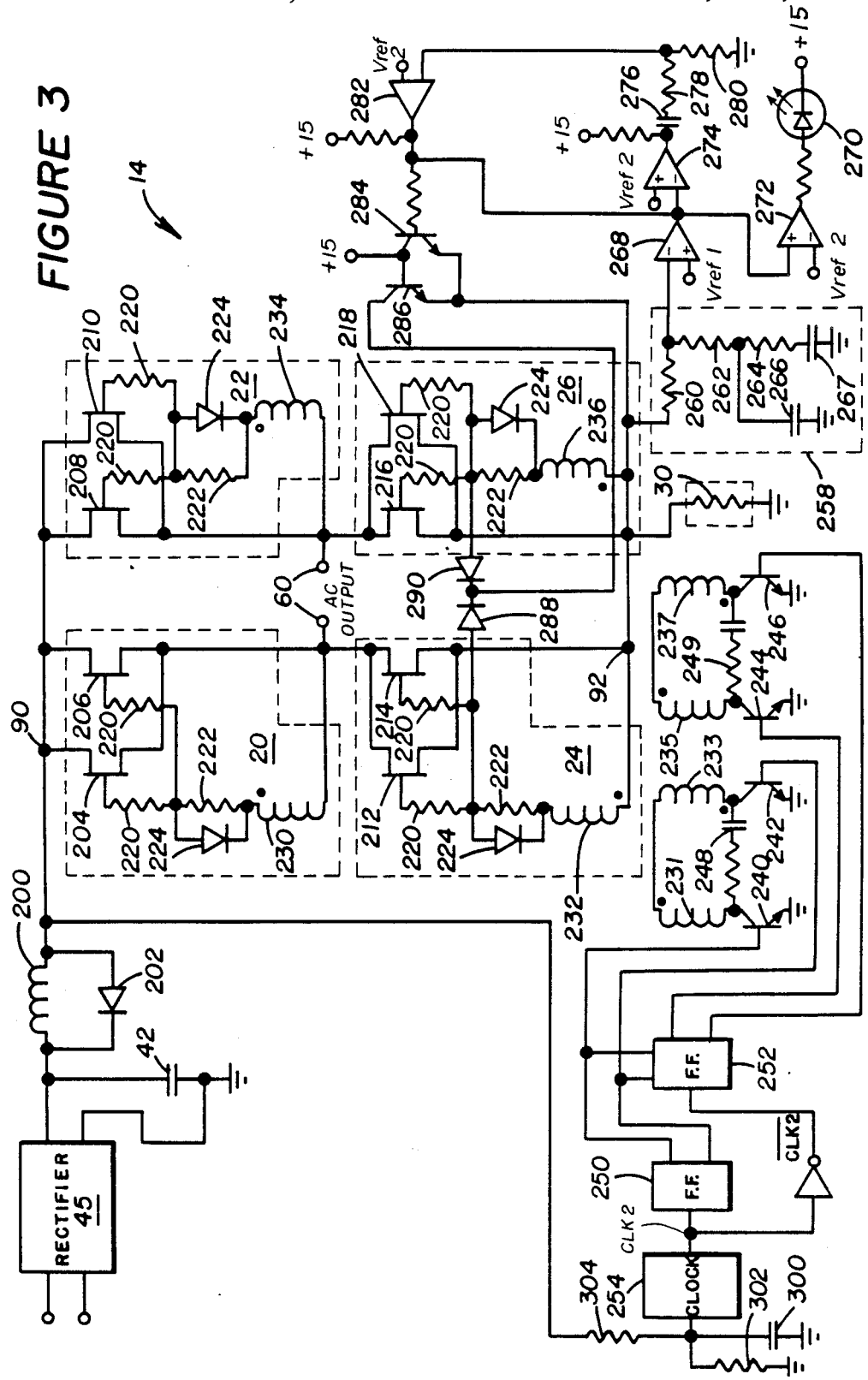
FIG. 3 is a more detailed schematic diagram of the secondary side of the inverter of FIG. 1 illustrating a DC-AC bridge converter according to the present invention.

FIG. 3 illustrates a detailed schematic diagram of the secondary side of the inverter 10 according to the present invention including a DC-AC transistor bridge converter 14. As seen in FIG. 3, the DC voltage across capacitor 42 is fed through a choke 200 to the bridge circuit. Choke 200 acts to add a rise time to the output current demand to give the bridge circuitry time to operate in case of a significant rapid overload condition. A diode 202 is connected across choke 200 to prevent ringing of the choke 200 if the load is suddenly removed from the bridge converter 14.

As seen in FIGS. 1 and 3, the 150 volts across capacitor 42 is fed to nodes 90 and 92 of the bridge converter 14. The field-effect transistors 20, 22, 24 and 26 are coupled as follows between these two voltage rails. The drain of transistor 20 is connected to node 90. The source of transistor 20 is connected to the drain of transistor 24 and to one of the AC output terminals 60. The source of transistor 24 is connected to node 92. The drain of transistor 22 is similarly connected to node 90 and its source is connected to the other AC output terminal 60 and to the drain of transistor 26. The source of transistor 26 is also connected to node 92.

Similarly to the DC to DC converter field-effect transistors 16, 18, each of the field-effect transistors 20, 22, 24 and 26 in bridge converter 14 may comprise a plurality of field-effect transistors coupled in parallel to improve the power capacity of each switch. Thus, field-effect transistor switch 20 comprises two field-effect transistors 204 and 206 connected in parallel. Similarly, transistor 22 comprises two parallel field-effect transistors 208 and 210, transistor 24 includes two parallel field-effect transistors 212 and 214 and transistor 26 includes two parallel field-effect transistors 216 and 218. In the following discussion, each of these field-effect transistor networks will be described as if it is a single field-effect transistor 20, 22, 24 and 26, respectively.

Each of these bridge transistors 20–26 is driven by one of two transformers T2 and T3. One winding 230 of transformer T2, having a first polarity, is connected to the gate of transistor 20. A second winding 232 of transformer T2, having the opposite polarity, is connected to the gate of transistor 24. Windings 231 and 233 of transformer T2 have a polarity which matches windings 230 and 232 respectively. Similarly, one winding 234 of transformer T3, having a first polarity, is connected to the gate of transistor 22 and a second winding 236, having the opposite polarity, is connected to the gate of transistor 26. Windings 235 and 237 of transformer T3 have a polarity which matches windings 234 and 236, respectively.

Each of the transistors 22-26 are separately driven by a gate resistor 220 of 100 ohms. Between respective windings 230-236 and resistors 220 is connected a second resistor 222 and a diode 224. Resistor 222 provides an additional turn on delay for each of the FETs 20, 22, 24 and 26 to ensure that a FET that is being turned off has sufficient time before turn on of the FET being turned on. Diode 224 bypasses resistor 222 when FET turnoff is performed to allow for fast turn off.

Transformers T2 and T3 are driven as follows. The collectors of bipolar transistors 240 and 242 are connected to windings 231 and 233, respectively, in transformer T2 and the collectors of transistors 244 and 246 are connected to windings 235 and 237, respectively, in transformer T3. Thus, when base drive is applied to a selected one of the transistors 240-246, current is caused to flow in the corresponding one of windings 231-237 connected to its collector. A snubber circuit is connected to each transformer T2 and T3 to prevent ringing in these transformers. These snubber circuits are RC networks and are shown at 248 and 249, respectively.

The transistors 240 and 242, which drive transformer T2, are driven by the Q and $\overline{Q}$ outputs, respectively, of flip-flop 250. The transistors 244 and 246, which drive transformer T3, are driven by the Q and $\overline{Q}$ outputs, respectively of flip-flop 252. Each of the flip-flops 250, 252 is a divide by two flip-flop and is caused to alternate states on opposite edges of a clock pulse CLK2 generated by a clock 254. Flip-flops 250, 252 and clock 254 operate in a manner as previously described, to create the quasi-square wave AC output across AC output terminals 60.

The leading edge of the CLK2 pulse generated by clock 254 is fixed at a predetermined clock frequency. To provide output regulation as a function of the input voltage appearing on capacitor 42, the trailing edge or turnoff time of clock 254 is controlled as a function of an RC circuit and the present value of the DC voltage coupled to the bridge rectifier 14. As seen in FIG. 3, the RC circuit comprises capacitor 300 and resistor 304. This timing circuit times out clock 254 as a function of the voltage being input to the bridge rectifier 14. Therefore, the higher the voltage input to rectifier 14, the sooner clock 254 will time out as a function of the value of capacitor 300. This clock time is the time of the half-cycle appearing on the output of the clock 254. This RC circuit therefore functions to linearly regulate the AC voltage output as a function of the DC input level.

A resistor 302 is connected in parallel with capacitor 300 to provide a further modification to the regulated output. To make the clock regulate the RMS output voltage, rather than a strictly averaged output voltage, resistor 302 nonlinearizes the regulation provided by capacitor 300 and resistor 304 to overcompensate for changes in the input DC level. In other words, resistor 302 sinks more current as the DC voltage approaches its peak, which prevents the capacitor from reaching as quickly the threshold voltage required to turn off the clock 254.

Figure 5:
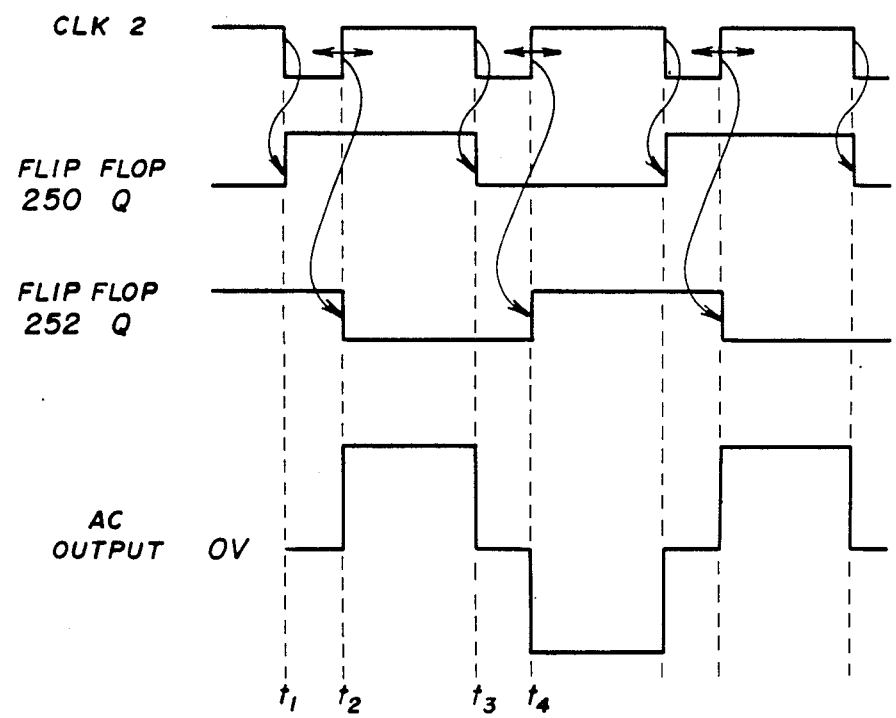
FIG. 5 is a timing diagram of the bridge converter shown in FIG. 3.
Figure 6:
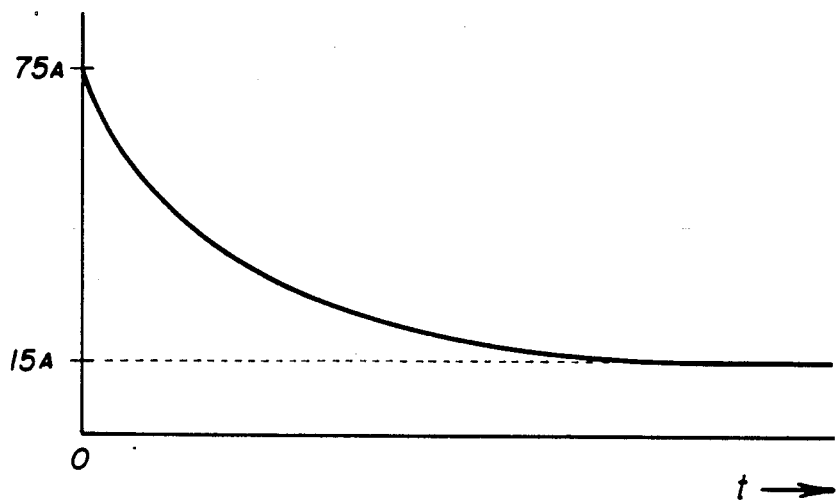
FIG. 6 is a diagram of the variation in current overload condition trip threshold vs. time according to the present invention.

Operation of bridge converter 14 is illustrated in the timing diagram shown in FIG. 5. As seen in FIG. 5, one edge of the CLK2 clock pulse varies as a function of the above described RC timing and the current level of the DC source voltage for bridge converter 14 which is coupled to this circuit. Thus, for example, an exemplary half-cycle of an AC output generated between time t1 and t4 is created as follows. The initial or leading edge of the CLK2 pulse occurring at time t1 causes the Q output of flip-flop 250 to go high and its $\overline{Q}$ output to go low. Also at this time, as seen, the state of the Q output of flip-flop 252 is high and its $\overline{Q}$ output line is low. The AC output from the time t1 until CLK2 changes state at t2 is at zero volts, since the above described output states of flip-flop 250 and 252 cause FET 20 to be on, FET 22 to be on, FET 24 to be off and FET 26 to be off. At time t2, CLK2 goes high at a variable time, depending on the regulation of the DC voltage input to the bridge regulator 14, causing flip-flop 252 to change state. This causes transistor 22 to go off and transistor 26 to go on. As a result, the AC output at this point rises to its maximum voltage, since the input DC voltage now appears across the AC output terminals 60 in a positive direction. At time t3, the CLK2 pulse again goes low, causing flip-flop 250 to change state and its Q output line to go low, its $\overline{Q}$ output line correspondingly to go high. This causes transistor 20 to go off and transistor 24 to go on. At this point, with transistor 24 and 26 on, again no voltage appears across the AC output terminals 60. At time t4, CLK2 pulse again goes high at a variable time causing flip-flop 252 to change its Q state to high and its $\overline{Q}$ state to low. As a result, the opposite polarity voltage appears across the AC output terminals 60. This cycle then continues as shown to create the previously described quasi-square wave output across terminals 60.

The current in bridge converter 14 flows through a sense resistor 30, as previously described, to provide a means for shutting down bridge converter 14 when an overload condition of sufficient magnitude and duration occurs.

The portion of controller 36 which operates on the voltage appearing across sense resistor 30 is as follows. The voltage across resistor 30 is coupled to a comparator 268 via an RC network 258 comprising resistors 260, 262 and 264 and capacitors 266 and 267. This RC network provides a double break timing system for delaying the turn-on of comparator 268. Resistors 260 and 262 are a voltage divider to provide a substantially instantaneous trip for comparator 268 if the voltage across resistor 30 is high enough. If not, capacitor 266 begins charging and thereby gradually elevates the junction of capacitor 266 and resistor 262, effectively reducing the level of current in resistor 30 required to trip comparator 268. To provide a pulse duration overcurrent of about 2 seconds when an overload magnitude of about a factor 2 over normal rated loading of the inverter 10 exists, a second time constant is provided by capacitor 267 and resistor 264.

When the voltage coupled to the comparator from the above described RC timing circuit exceeds $V_{ref1}$, the output of comparator 268 goes low to indicate shutdown. Comparator 268 feeds an overload shutdown indicator light 270 via a buffer amplifier 272. The output of comparator 268 also feeds the base of a transistor driver comprising transistors 284 and 286 which clamps the gates of transistors 24 and 26 to system ground via diodes 288 and 290 when these transistors 284 and 286 are turned on. This shuts down further operation of bridge converter 14.

Comparator 268 also feeds a buffer inverter 274. The output of buffer 274 is fed through a second RC timing circuit comprising capacitor 276 and resistors 278 and 280 to another comparator 282. The RC circuit comprising resistors 278 and 280 and capacitor 276 and comparator 282 function to turn on and reenable the gates of transistor 24 and 26 at a predetermined time after shutdown has began.

Figure 7:
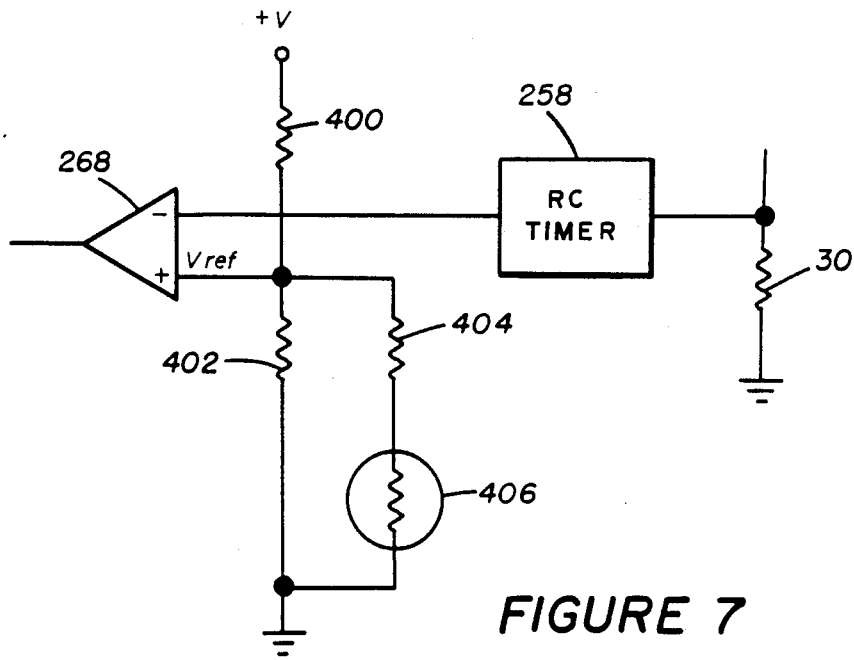
FIG. 7 illustrates an alternate embodiment of the present invention further including a temperature compensation circuit.

FIG. 7 illustrates an alternate embodiment of the present invention including a temperature compensation circuit. As previously described, the ability of field-effect transistors to handle overload current drops as the ambient temperature increases. When the temperature is about 250° C., for example, the rated current load of a FET may be 18 amps, whereas the rated current load may drop to 12 amps at 100 C. The alternate embodiment shown in FIG. 7 is designed to reduce the amount of overload which will trip a shutdown condition as a function of increased temperature.

As seen in FIG. 7, $V_{refl}$ is normally generated in a conventional manner, as by using a voltage divider comprising a first resistor 400 and a second resistor 402. In the present embodiment, resistor 400 is a 100 kilohm resistor and resistor 402 is a 1 kilohm resistor. With a positive voltage applied to resistor 400 of 15 volts, a $V_{refl}$ of 150 millivolts is generated at the plus input of comparator 268. The balance of the circuit shown in FIG. 7 is as shown in FIG. 3, and includes the RC timer 258 input to comparator 268 and the current sensing resistor 30.

In order to provide a variation in the value of $V_{refl}$ as a function of temperature, and thereby adjust the trip point of the overload protection circuit, the alternate embodiment includes adding a resistor network in parallel with resistor 402. This includes a resistor 404 and a negative temperature coefficient resistor 406. Such negative temperature coefficient resistors are common in the art and create a reduced threshold resistance as the temperature goes up. Consequently, since resistor 404 and 406 are in parallel with 402, the equivalent network resistance appearing between the positive input to comparator 268 and ground goes down as a function of the variation in resistance of resistor 406. Thus, with proper selection of the values of resistors 404 and 406, the threshold at which comparator 268 goes on will accurately track the temperature sensitivity of the field-effect transistors used in inverter 10.

It is of course understood that although the preferred embodiments of the present invention have been illustrated and described, various modifications, alternatives and equivalents thereof will become apparent to those skilled in the art, and, accordingly, the scope of the present invention should be defined only by the appended claims and equivalents thereof.

What is claimed is:

1. An inverter circuit for converting a low voltage DC source into a higher voltage output AC source generated between first and second AC output terminals, comprising:
   means for converting said low voltage DC source into a higher second DC voltage source including a positive node and a negative return node;
   bridge converter means including first, second, third and fourth field-effect transistors for converting said second DC voltage source into an output AC source, each of said first, second, third and fourth field-effect transistors including gate, source and drain terminals, the drain of said first transistor connected to said positive node, said source of said first transistor connected to said first output AC terminal and to said drain of said second field-effect transistor, the source of said second field-effect transistor connected to said negative return node, the drain of said third field-effect transistor connected to said positive node, the source of said third field-effect transistor connected to said second AC output terminal and to the drain of said fourth field-effect transistor, and a source of said fourth field-effect transistor connected to said negative return node, said bridge converter means further comprising means for driving said first, second, third and fourth field-effect transistor for periodically translating said transistors between their conducting and non-conducting states, said driving means comprising:
   first, second, third and fourth driver switches;
   a first transformer having first, second, third and fourth windings, said first winding connected between the gate of said first field-effect transistor and the source of said first field-effect transistor, said third winding connected between the gate and source of said second field-effect transistor, said second winding connected to said first driver switch and said fourth winding connected to said second driver switch;
   a second transformer having first, second, third and fourth windings, said first winding connected between the gate and source of said third field-effect transistor, said third winding connected between the gate and source of said fourth field-effect transistor, said second winding connected to said third driver switch and said source winding connected to said fourth driver switch;
   such that when a respective first, second, third or fourth driver switch means turns on, current is caused to flow through its associated said winding so as to create a voltage drop in a respective winding connected to a field effect transistor gate sufficient to cause said field-effect transistor to switch from a non-conducting to a conducting state; and
   control means for providing control signals to said first, second, third and fourth driver switches in a predetermined sequence such that a quasi-square wave is generated across said AC output terminals; and
   means for detecting an AC output overcurrent condition and for disabling said bridge converter means as a predetermined function of the amplitude and time duration of said overcurrent condition.

2. The inverter of claim 1 wherein said control means comprises a first flip-flop whose output states control the state of said first and second driver switches respectively;
   a second flip-flop whose output states control the state of said third and fourth driver switches; and
   a clock for generating alternating pulses for periodically changing the state of said first flip-flop and said second flip-flop, including means for regulating the time at which said flip-flops change state as a function of the current level of said second DC source voltage.

3. An inverter circuit for converting a low voltage DC source into a higher voltage output AC source generated between first and second AC output terminals, comprising:

means for converting said low voltage DC source into a higher second DC voltage source including a positive node and a negative return node;

bridge converter means including first, second, third and fourth field-effect transistors for converting said second DC voltage source into an output AC source, each of said first, second, third and fourth field-effect transistors including gate, source and drain terminals, the drain of said first transistor connected to said positive node, said source of said first transistor connected to said first output AC terminal and to said drain of said second field-effect transistor, the source of said second field-effect transistor connected to said negative return node, the drain of said third field-effect transistor connected to said positive node, the source of said third field-effect transistor connected to said second AC output terminal and to the drain of said fourth field-effect transistor, and the source of said fourth field-effect transistor connected to said negative return node, and wherein each of said first, second, third and fourth field-effect transistor comprise at least two field-effect transistor connected in parallel; and means for detecting an AC output overcurrent condition and for disabling said bridge converter means as a predetermined function of the amplitude and time duration of said overcurrent condition.

4. The inverter circuit of claim 3 wherein said means for detecting an AC output overcurrent condition and for disabling said bridge converter means further comprises means for reducing the amount of amplitude of said overload condition required to disable said bridge converter means as a function of increasing temperature.

5. The inverter of claim 4 wherein said means for reducing the amount of overload comprises a negative temperature coefficient resistor.

6. The inverter circuit of claim 1 wherein said means for detecting an AC output overcurrent condition and for disabling said bridge converter means further comprises means for reducing the amount of amplitude of said overload condition required to disable said bridge converter means as a function of increasing temperature.

* * * * *